United States Patent
Beyfuss et al.

(10) Patent No.: US 11,319,992 B2
(45) Date of Patent: May 3, 2022

(54) CAGE SEGMENT FOR A ROLLING-ELEMENT BEARING CAGE

(71) Applicant: AKTIEBOLAGET SKF, Gothenburg (SE)

(72) Inventors: Berthold Beyfuss, Wasserlosen-Kaisten (DE); Hans-Juergen Friedrich, Königsberg-Römershofen (DE); Alfred Radina, Poppenlauer (DE); Maximilian Soellner, Bundorf (DE); Johannes Ullmann, Wonfurt (DE); Stefan Volpert, Bergrheinfeld (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 17/151,974

(22) Filed: Jan. 19, 2021

(65) Prior Publication Data

US 2021/0254665 A1    Aug. 19, 2021

(30) Foreign Application Priority Data

Feb. 14, 2020   (DE) .......................... 102020201872.3

(51) Int. Cl.
| | | |
|---|---|---|
| *F16C 33/46* | (2006.01) | |
| *F16C 19/36* | (2006.01) | |
| *F16C 33/54* | (2006.01) | |
| *F16C 33/51* | (2006.01) | |

(52) U.S. Cl.
CPC ........ *F16C 33/4617* (2013.01); *F16C 19/361* (2013.01); *F16C 33/513* (2013.01); *F16C 33/542* (2013.01)

(58) Field of Classification Search
CPC .......................... F16C 19/361; F16C 33/3812; F16C 33/3831; F16C 33/42; F16C 33/422; F16C 33/4611; F16C 33/4617; F16C 33/4641; F16C 33/4647; F16C 33/4658; F16C 33/4664; F16C 33/50; F16C 33/54; F16C 33/542; F16C 33/513
See application file for complete search history.

(56) References Cited

U.S. PATENT DOCUMENTS

| 8,794,845 B2 * | 8/2014 | Beck ...................... B21D 53/12 |
| | | 384/573 |
| 8,926,190 B2 * | 1/2015 | Fox ....................... F16C 33/506 |
| | | 384/573 |

FOREIGN PATENT DOCUMENTS

| DE | 874683 | * | 4/1953 |
| DE | 102006045436 | * | 3/2008 |
| DE | 102017101034 | * | 7/2018 |
| WO | WO2018092612 | * | 5/2018 |

OTHER PUBLICATIONS

Translation of DE 874683 obtained Oct. 6, 2021.*

* cited by examiner

*Primary Examiner* — James Pilkington
(74) *Attorney, Agent, or Firm* — J-TEK Law PLLC; Scott T. Wakeman; Mark A. Ussai

(57) ABSTRACT

A cage segment is for a rolling-element bearing cage, particularly for large rolling-element bearings. The cage segment includes a first side element and a second side element that are connected by a first bridge and a second bridge. At least one pocket is formed between the first and second bridges which is suitable for receiving at least one rolling element. The cage segment is manufactured from sheet metal.

8 Claims, 4 Drawing Sheets

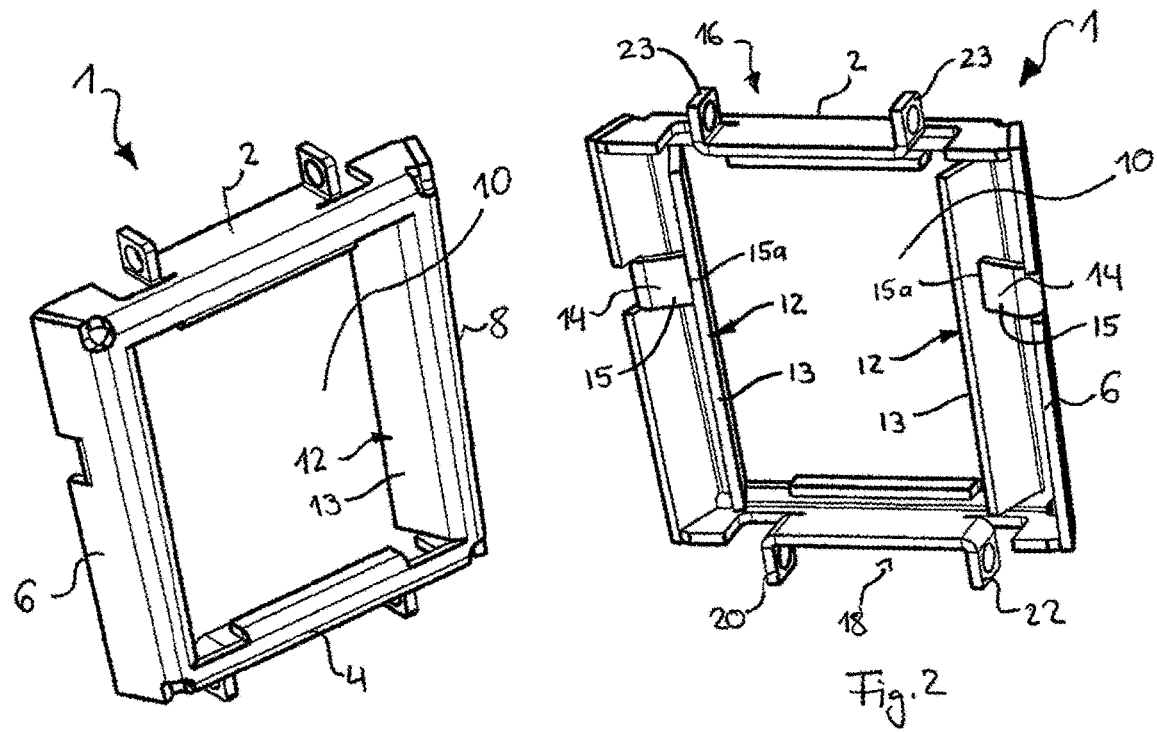
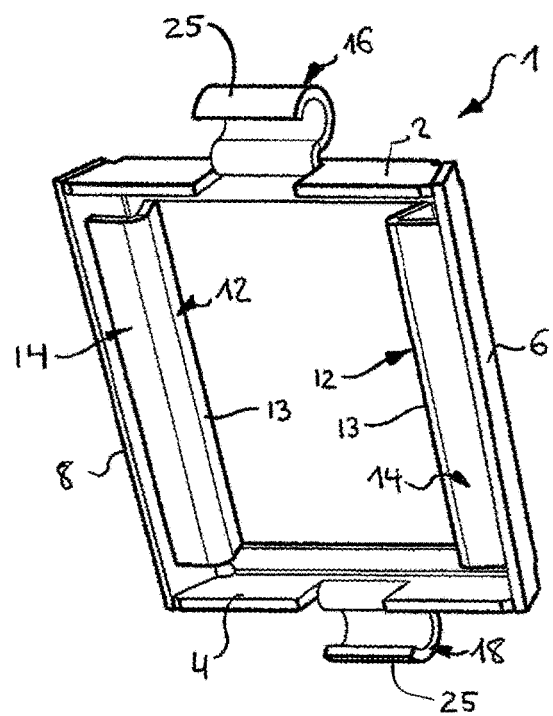

CAGE SEGMENT FOR A ROLLING-ELEMENT BEARING CAGE

CROSS-REFERENCE

This application claims priority to German Patent Application No. 10 2020 201872.3 filed on Feb. 14, 2020, the entire contents of which are fully incorporated herein by reference.

BACKGROUND OF THE INVENTION

The present invention relates to bearings, and more particularly to cage segments for rolling-element bearing cages.

Various manufacturing methods are known for fabricating rolling-element bearing cages, particularly made from a metallic material, such as, for example, flow forming with subsequent punching and stamping or laser cutting. The type of manufacturing method used depends, inter alia, on the size of the cage. Alternatively, metal cages, particularly larger cages, may be manufactured by first rolling solid material and then further machining it. What the known methods have in common is that, on the one hand, they require a large amount of material and, on the other hand, require a combination of several, in some cases complex, manufacturing processes with different machine tools, so that manufacturing is often complex and/or costly.

It is therefore the object of the present invention to provide a cage segment for a rolling-element bearing cage which may be manufactured in a simple and cost-effective manner.

SUMMARY OF THE INVENTION

The present cage segment basically comprises a first and a second side element that are connected by a first bridge and a second bridge, wherein at least one pocket is formed between the first and second bridge, the pocket being suitable for receiving at least one rolling element. In order to reduce material usage and manufacturing expense, the proposed cage segment is manufactured from sheet metal. In particular, the degree of material utilization can also be increased with a corresponding decrease in material waste or scrap.

The sheet metal can be in particular a sheet metal plate, a sheet metal panel, or the like. Sheet metal can be processed and shaped in a simple and cost-effective manner, for example, by cutting and bending, such as in a stamping operation. In particular, a subsequent machining method (i.e., finish machining) can be omitted.

The cage segment can be a single segment or formed of multiple segments. Preferably a single rolling element may be received in each individual single cage segment. A "multiple segment" is understood to mean herein a cage segment that may receive a plurality of rolling elements. For this purpose, a plurality of pockets may be formed in the cage segment, wherein at least one rolling element may be received in each pocket. The cage segment can be used, in particular, in large rolling-element bearings.

The cage segment is preferably detached from the sheet metal in an unfolded or unbended form, wherein the detaching comprises a cutting, punching, and/or nibbling. In other words, the separating lines required for the cage segment are provided in the sheet metal by cutting, punching, nibbling, or the like. This means that the contours (inner and outer) of the cage segment are first cut or punched into the sheet metal, and then the form of the cage segment is detached from the sheet metal. Here a laser, a punching tool, a nibbling machine, or the like can be used. An unfolded form is understood to mean in particular a flat, essentially two-dimensional, unwound or unbended form of the finished three-dimensional cage segment. That is, the form detached from the sheet metal essentially corresponds to the two-dimensional unwinding or folding/bending template of the finished cage segment.

The cage segment can subsequently be shaped by bending and/or folding the detached, unfolded form of the cage segment. In particular, after the unfolded form of the cage segment has been detached from the sheet metal, the sheet metal can be bent in order to obtain the finished cage segment. The bending and/or folding is preferably carried out in the same machine as the detaching of the cage segment, wherein, for example, a punch laser bending machine can be used. Alternatively, the bending and/or folding can be carried out in a different machine than that which performs the detaching. In order to simplify a possible transfer of the unfolded form of the cage segment that has been detached from the sheet metal to a further machine tool, it is also possible to leave individual connection points in the region of the separating lines and to only detached them after the further processing step.

A machine tool may be used for manufacturing the cage segment that can both detach the form of the cage segment from the sheet metal and also subsequently bring or shape/bend the detached cage segment form into the finished cage shape. A plurality of work steps can thereby be carried out in a single machine tool. Manufacturing expense can thus be reduced, since only a single and not multiple machine tools are required.

Since no finish machining method is used, the material usage is lower and less material waste results. The manufacturing costs for the cage segment and consequently for a rolling-element bearing cage made of a plurality of cage segments can thereby be reduced.

Furthermore, connections, such as for example, two connecting elements that can be brought into engagement in a meshing manner, can be provided in order to connect two cage segments to each other, in particular in the axial direction.

According to a further embodiment, the cage segment includes at least one slip surface and at least one support surface that is configured to support the at least one slip surface. The support surface may be, for example, a support bridge. Alternatively the support surface may extend over the entire length of the bridge. For example, the support surface can be supported against a rear side of a further surface of the cage segment, such as, for example, a further slip surface.

In particular, the at least one slip surface can be disposed on one side of the first or second bridge. The at least one slip surface is preferably formed on an inner side of one of the bridges, i.e., on the side that points or faces toward the pocket. Alternatively or additionally, the at least one slip surface can also be formed on an outer side of one of the bridges. If the at least one slip surface is also formed on the outer side of one of the bridges, for example, every second rolling element can be guided in a cage segment. If a cage segment is respectively provided for each individual rolling element, a slip surface formed on the outer side of one of the bridges can be omitted.

Furthermore, in the unfolded/unbended or flat state, the slip surface can advantageously be provided with textures or structurings. For example, the provided textures can improve a lubricant supply for the rolling element slipping against the slip surface, for example, by facilitating a supplying of new lubricant to the rolling element and/or a removal of old lubricant from the rolling element.

According to a further embodiment, a first attachment element can be disposed on the first side element and/or a second attachment element can be disposed on the second side element, wherein the cage segment is connectable to a further cage segment via the first and/or the second attachment element using a coupling means.

The cage segments can be additionally held together by the coupling means, whereby the cage composite gains stability and/or an installing of the cage can be simplified. The cage segments can be guided by the coupling means, which can be, for example, a cable, wire, or a ring and has a defined preload.

The first and/or the second attachment element can preferably be configured as eyelets, through which the coupling element is threadable. In one design of the attachment elements as eyelets the coupling element can be guided through these eyelets in a simple manner and removed again if required. Here the coupling element is not fixed to the eyelets, but rather can move in the eyelets. A clearance between the cage segments, and thus the rolling elements and a movement of the cage segments with respect to one another is thereby not restricted. Alternatively, the eyelets can also be configured as open hooks or loops into which the coupling element is mountable or clippable or snappable.

According to a further aspect, a rolling-element bearing cage is proposed, in particular for a large rolling-element bearing, that includes a plurality of cage segments, wherein a plurality of cage segments are connectable at least temporarily via a coupling element, for which purpose the coupling element is brought into engagement with the attachment elements. Here, for example, every second rolling element can be guided in a cage segment. Alternatively a cage segment can also be provided for each rolling element. For example, the outer diameter of the rolling-element bearing cage can be more than 1200 mm.

According to still a further aspect, a rolling-element bearing, in particular a large rolling-element bearing, is proposed that includes at least one inner ring and at least one outer ring, wherein rolling elements are disposed between the inner ring and the outer ring, wherein the rolling elements are held by an above-described rolling-element bearing cage.

According to a further aspect, a method is proposed for manufacturing a cage segment from sheet metal, wherein the method includes the steps of a detaching an unfolded form of the cage segment from the sheet metal, and bending and/or folding the unfolded form in order to form the cage segment. The manufacturing of the cage segment can advantageously be carried out in a punch laser bending machine, completely or successively combined.

Further advantages and advantageous embodiments are specified in the description, the drawings, and the claims. Here in particular the combinations of features specified in the description and in the drawings are purely exemplary, so that the features can also be present individually or combined in other ways.

BRIEF DESCRIPTION OF THE SEVERAL VIEWS OF THE DRAWINGS

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims. In the drawings:

FIG. 1 shows a perspective view of a cage segment according to a first embodiment;

FIG. 2 shows a further perspective view of the cage segment according to the first embodiment;

FIG. 3 shows a perspective view of the cage segment according to a second embodiment;

DETAILED DESCRIPTION OF THE INVENTION

Figure 4:
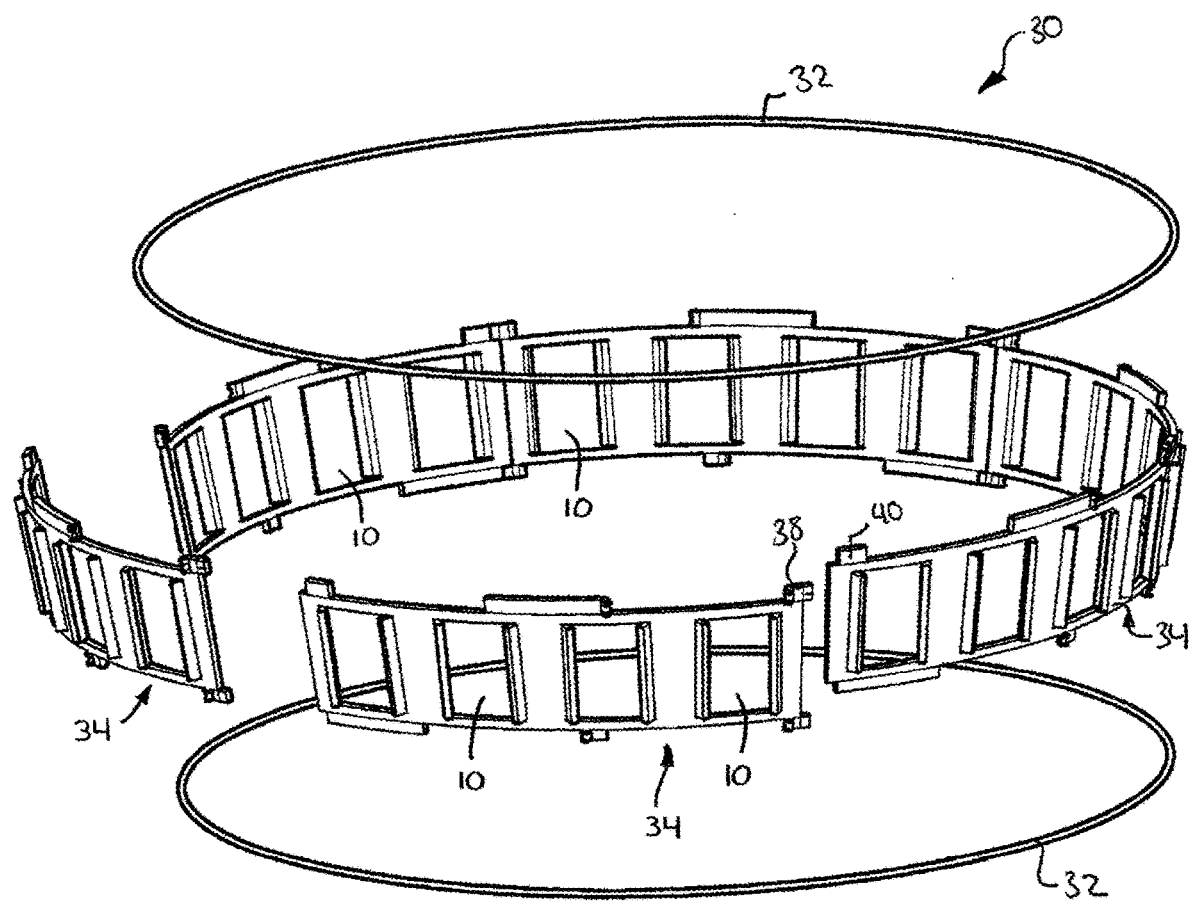
FIG. 4 shows an exploded view of a rolling-element bearing cage according to a third embodiment.

In the following, identical or functionally equivalent elements are designated by the same reference numbers.

FIGS. 1 and 2 show perspective views of a cage segment 1 according to a first embodiment. The cage segment 1 comprises a first side element 2 and a second side element 4, wherein the first and second side elements 2, 4 are connected by a first bridge 6 and by a second bridge 8. At least one pocket 10 is formed between the first and second side elements 2, 4 and between the first and second bridges 6, 8. The at least one pocket 10 is configured to receive at least one rolling element (e.g., rolling element 36; see FIG. 5).

The cage segment 1 is preferably manufactured from sheet metal, specifically by the cage segment 1 being detached or separated from a piece of sheet metal (e.g., a blank, a strip, etc.) in an unfolded or unwound form by cutting, punching, and/or nibbling, and then formed, for example, by bending and/or folding of the detached unbended form. In particular, sections of each of the first and second bridges 6, 8 may be bent-over such that slip or contact surfaces 12 are formed for the rolling elements which are receivable in the pocket 10; in other words, the surfaces 12 guide and/or support the rolling elements during rolling or rotation thereof, such that the rolling elements slide against the surface 12. For example, a contact section 13 of each bridge 6, 8 may be bent or folded against each other so that a triangular shape (i.e., cross-sectional) is formed that is open on one side, the respective sides of the bent/folded bridge contact sections 13 forming or providing the slip/contact surfaces 12 and the top of each bent/folded section forming the corresponding bridges 6, 8. Alternatively, other folded or bent shapes may be formed in the cage segment 1 to obtain other desired shapes for the bridges 6, 8 and the contact surfaces 12.

In order to improve the stability of each slip surface 12, and thus the cage section 13 providing the slip surface 12, a support surface 14 may be provided that is configured to support the one slip surface 12 of a respective bridge 6 against the other slip surface 12 of the same bridge 6, 8. As can be seen in FIG. 2, the support surface 14 may be formed in the shape of a support bridge or tab that is cut out from a region of the slip surface 12 of one of the bridges 6, 8 and bent over such that the two adjacent slip/contact surfaces 12 of the respective bridge 6, 8, are supported against each other by the support surface 14. That is, the support surface or member 14 may be formed by cutting and bending a portion of each bridge 6, 8 to form a generally rectangular tab 15 that has a free end 15a that abuts against an adjacent cage contact section 13 to prevent displacement thereof in a direction away from a center or the cage segment 1.

Furthermore, a first attachment element 16 or a second attachment element 18 may be disposed on the first and second side elements 2, 4. In this embodiment, the first and second attachment elements 16, 18 are formed or provided by a section of the first or second side elements 2, 4 on which two eyelets 20, 22 are respectively disposed, through which a coupling element (not shown here) is threadable or insertable.

The eyelets 20, 22 may be formed, for example, on a flap or tab 23 that is first partially detached or cut, and then subsequently bent and/or folded, such that the openings of the eyelets 20, 22 oppose each other, enabling the coupling element to be threaded or inserted therethrough. In this case, a cable or wire may be used as a coupling element, the ends of such cable or wire are connected to each other after threading-through the eyelets 20, 22. With the coupling element and the attachment elements 16, 18, a plurality of cage segments 1 may be held or connected together, whereby a cage composed or formed of a plurality of the cage segments 1 gains stability and/or an installation of such a cage is simplified.

FIG. 3 shows an alternative embodiment of the cage segment 1, wherein the respective support surface or member 14 extends over the entire length of the respective bridges 6, 8. That is, in contrast to the embodiment shown in FIG. 2, in which a cut and bended section 15 of the cage segment 1 provides the support surface/member 14, no cuts or separating lines are used to cut out a support member from a section of one of the bridges 6, 8; instead, a part of the section 13 that forms or provides the slip surface 12 is bent further (i.e., a second bend outwardly away from the center of the cage segment 1), so that it can be supported directly against one of the bridges 6, 8.

Furthermore, the cage segment 1 shown in FIG. 3 includes attachment elements 16, 18 configured as loops 25, such that a coupling element, for example, may extend into or be disposed within the attachment elements 16, 18 and be suspended thereby. Preferably, the basic shape of each loop 25 is cut out from the section of the sheet metal blank or strip when the unbended form of the cage segment 1 is detached, the basic shape forming part of one side element 2 or 4 of the finished cage segment 1, and is subsequently bent over to form the loop 25.

FIG. 4 shows an exploded view of a rolling-element bearing cage 30 including a plurality of cage segments 34. As depicted, the cage segments 34 can also be configured as multiple segments, wherein each such multiple segment includes a plurality of pockets 10 disposed adjacent to one another, into each of such pockets 10 at least one rolling element is receivable. As described above, each multiple segment 34 can be connected to a further multiple segment 34 via a coupling element 32. For this purpose, the coupling elements 32 can be brought into engagement with the attachment elements 16, 18 provided on the cage segments (see FIGS. 1 to 3). Here, as shown in FIG. 4, a coupling element 32 can be provided on both sides of each segment 34, or only on one of the two sides of each segment 34.

In order to also connect the cage segments 34 to one another, connecting elements 38, 40 are provided that may be brought into engagement with one another, so that adjacent cage segments 34 may be connected together. As with the attachment elements 16, 18 shown in FIGS. 1 to 3, these connecting elements 38, 40 may be detached or cut from the sheet metal blank or roll by cutting, punching, and/or nibbling, and then fashioned to a desired final shape by a corresponding bending and/or folding operation.

Figure 5:
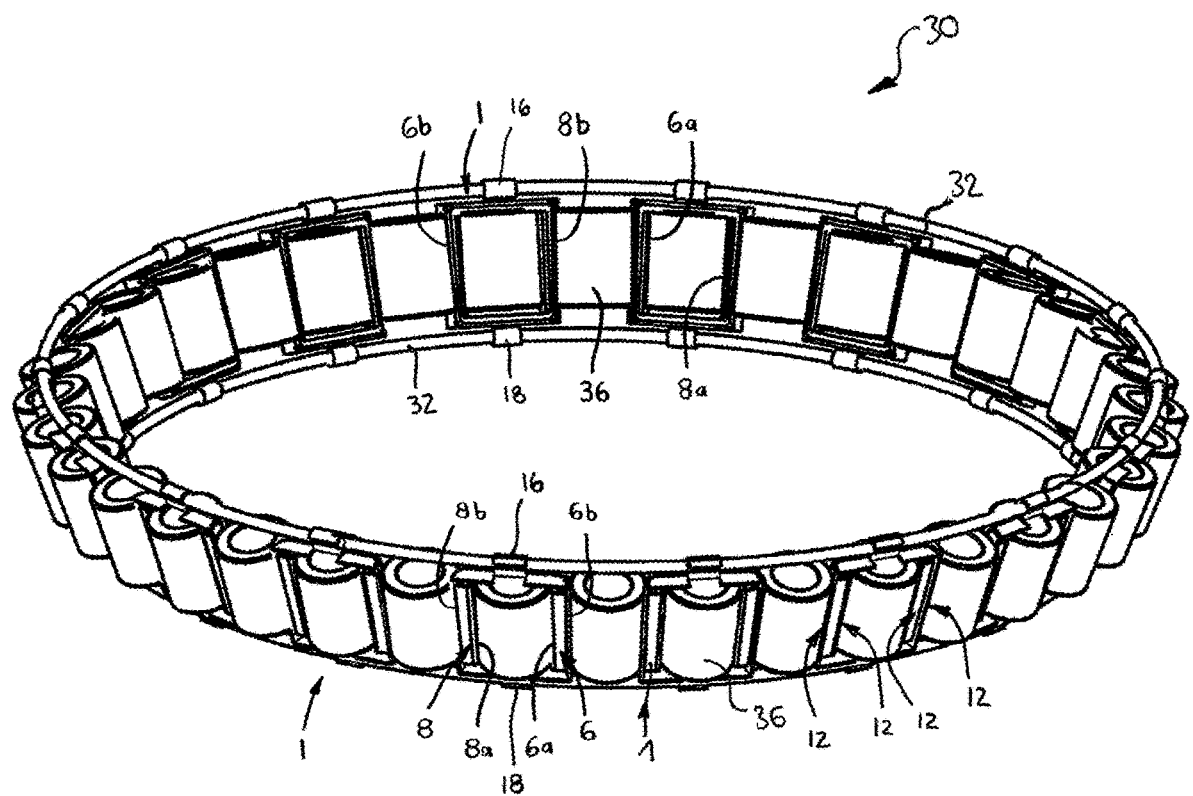
FIG. 5 shows a perspective view of the assembled rolling-element bearing cage according to the third embodiment.

FIG. 5 shows a perspective view of a rolling-element bearing cage 30 according to an alternative embodiment. In this case, each cage segment 1 includes only one pocket 10, such that the rolling-element bearing cage 30 includes a plurality of cage segments 1 each having a single pocket 10 into each of which a rolling element 36 is received. In this embodiment, a cage segment 1 is respectively provided for every second rolling element 36, i.e., only every other rolling element 36 about the circumferential perimeter of the cage 30 is disposed within the pocket 10 of a separate cage segment 1. For this purpose, each cage segment 1 may include two slip surfaces 12, one slip surface 12 being provided on the "inner" side 6a, 8a of each respective bridge 6, 8 directed towards the pocket 10, and the other slip surface 12 being provided on the "outer" side 6b, 8b of a respective bridge 6, 8 facing away from the pocket 10. If a slip surface 12 is also formed on the outer side 6b, 8b of a respective bridge 6, 8, it is sufficient if only every second rolling element 36 is guided in a cage segment 1.

Figure 6:
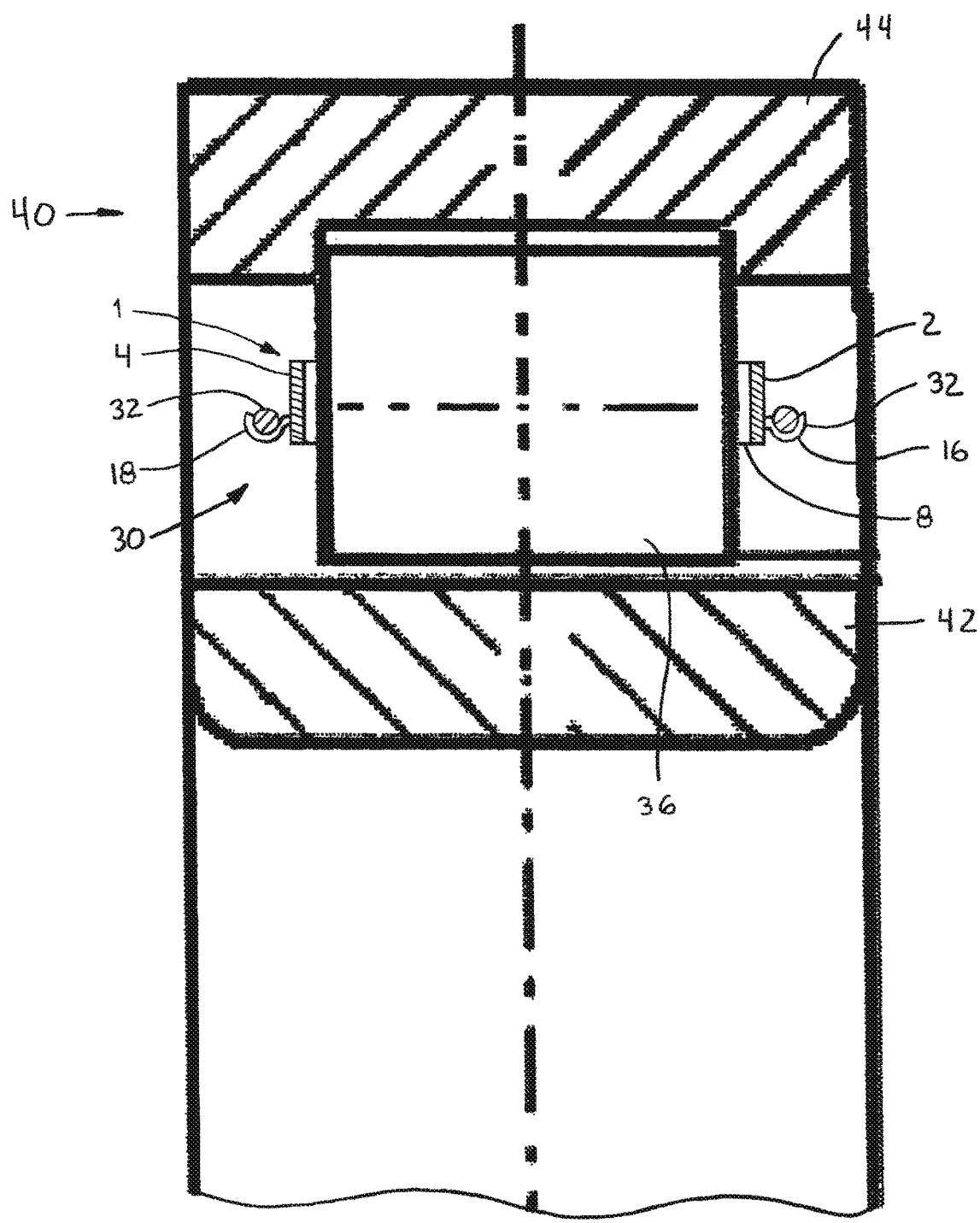
FIG. 6 is a broken-away, axial cross-sectional view of a bearing including the bearing cage of FIG. 5.

Further, as shown in FIG. 6, a rolling-element bearing 40, in particular a large rolling-element bearing, may include at least one inner ring 42, at least one outer ring 44, and a plurality of rolling elements 36 disposed between the inner ring 42 and the outer ring 44. In such a bearing 40, the rolling elements 36 are preferably held by one of the above-described rolling-element bearing cages 1 or 30 (cage 30 depicted).

In order to reduce material usage and manufacturing expense, it is proposed to manufacture the cage segment 1 or 34 from sheet metal, so that a material-intensive and effort-intensive machining method can be omitted. In such a case, the cage segment 1 or 34 is preferably detached from the sheet metal (e.g., a blank, a strip, a roll, etc.) in an unfolded or unbended form and then formed by bending and/or folding of the detached, unfolded form of the cage segment. The bending and/or folding is preferably carried out in the same machine as the releasing or cutting of the cage segment 1, wherein, for example, a punch laser bending machine can be used.

Since no machining method is used, material usage is reduced and less material waste arises. The costs for fabricating the cage segment 1 or 34 and consequently for a rolling-element bearing cage made of a plurality of cage segments can thereby be reduced.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

We claim:

1. A cage segment for a rolling-element bearing cage for rolling-element bearings, the cage segment comprising:
    a first side element and a second side element; and
    a first bridge and a second bridge each connecting the first and second side elements such that at least one pocket is formed between the first and second bridges, the pocket being configured to receive at least one rolling element;
    wherein the cage segment is manufactured from sheet metal and includes at least one slip surface and at least one support surface that is configured to support the at least one slip surface, the at least one slip surface including at least one of an inner slip surface formed on one side of the first or second bridge that faces the pocket and an outer slip surface formed on the other side of the first or second bridge that faces away from the pocket.

2. The cage segment according to claim 1, wherein the cage segment is detached from the sheet metal in an unfolded form, wherein the detaching is accomplished by a cutting operation, a punching operation and/or nibbling operation.

3. The cage segment according to claim 2, wherein the cage segment is formed by bending and/or folding of the detached, unfolded form of the cage segment.

4. The cage segment according to claim 1, wherein the at least one support surface extends over substantially the entire length of one of the first and second bridges.

5. The cage segment according to claim 1, wherein:
    a first attachment element is disposed on the first side element and/or a second attachment element is disposed on the second side element; and
    the cage segment is connectable to another cage segment by at least one coupling element engaged with the first attachment element and/or with the second attachment element.

6. The cage segment according to claim 5, wherein one of:
    the at least one of the first attachment element and/or the second attachment element is configured as an eyelet through which the coupling element is threadable; or
    the at least one of the first attachment element and/or the second attachment element is configured as a loop into which the coupling element is mountable.

7. A rolling-element bearing cage comprising:
    a plurality of cage segments, each cage segment including a first side element and a second side element and a first bridge and a second bridge each connecting the first and second side elements such that at least one pocket is formed between the first and second bridges, the pocket being configured to receive at least one rolling element and the cage segment being manufactured from sheet metal, and further including a first attachment element disposed on the first side element and/or a second attachment element disposed on the second side element;
    wherein each cage segment includes at least one slip surface and at least one support surface that is configured to support the at least one slip surface, the at least one slip surface including at least one of an inner slip surface formed on one side of the first or second bridge that faces the pocket and an outer slip surface formed on the other side of the first or second bridge that faces away from the pocket; and
    wherein the plurality of cage segments are connectable at least temporarily by a coupling element engaged with the each of the first attachment elements or with each of the second attachment elements.

8. A rolling-element bearing comprising:
    at least one inner ring, at least one outer ring, a plurality of rolling elements disposed between the inner ring and the outer ring; and
    a rolling-element bearing cage holding the plurality of rolling elements and including a plurality of cage segments, each cage segment including a first side element and a second side element and a first bridge and a second bridge each connecting the first and second side elements such that at least one pocket is formed between the first and second bridges, the pocket being configured to receive at least one rolling element and the cage segment being manufactured from sheet metal, and further including a first attachment element disposed on the first side element and/or a second attachment element disposed on the second side element,
    wherein each cage segment includes at least one slip surface and at least one support surface that is configured to support the at least one slip surface, the at least one slip surface including at least one of an inner slip surface formed on one side of the first or second bridge that faces the pocket and an outer slip surface formed on the other side of the first or second bridge that faces away from the pocket; and
    wherein the plurality of cage segments are connectable at least temporarily by a coupling element engaged with the each of the first attachment elements or with each of the second attachment elements.

* * * * *